Figure 1:
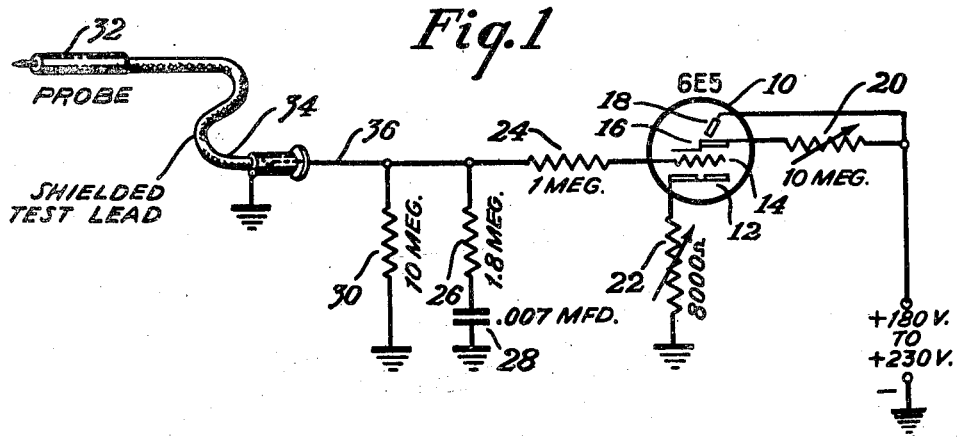

Dec. 28, 1948.  A. LIEBSCHER  2,457,575

VOLTAGE INDICATOR

Filed May 23, 1944

INVENTOR.
Arthur Liebscher
BY
ATTORNEY

Patented Dec. 28, 1948

2,457,575

UNITED STATES PATENT OFFICE 2,457,575

VOLTAGE INDICATOR

Arthur Liebscher, Philadelphia, Pa., assignor to Radio Corporation of America, a corporation of Delaware Application May 23, 1944, Serial No. 536,892

2 Claims. (Cl. 175—183)

This invention relates to a voltage indicator, and particularly to an electron ray tube voltage indicator which includes signal input electrodes and a fluorescent target electrode.

The use of such electron ray tubes to indicate the polarity of direct current voltages is well known. Generally such tubes are used to indicate unvarying voltages, such as those derived from the automatic volume control circuit of a radio receiver, the indication consisting in the reduction of the angle of the shadow visible in the fluorescent target of the tube when the applied voltage is negative. Conversely, a positive voltage causes an increase in the shadow angle; but since substantial positive voltages applied to the grid of the electron ray tube would cause such a flow of grid current as to ruin the tube, it has been necessary to include voltage dividers in prior art devices of this type, with a consequent reduction in sensitivity.

Various methods have been proposed for indicating and identifying alternating voltages, whether regularly or irregularly alternating, by means of an electron ray tube. In the absence of auxiliary apparatus, and particularly at alternations of high frequency, such fluctuation in and overlapping of the differently illuminated portions of the target occurs as to fail to give a completely satisfactorily identifiable indication of the nature of the applied voltage.

An object of the invention is to provide an improved indicator which will show the polarity of voltages in the range from .5 volt to 1,000 volts without use of an attenuator, which will distinguish between low, intermediate and high voltages in that range, and between steady and alternating voltages, and which will indicate the presence of inconsistent composite waves and interrupted continuous waves.

A further object of the invention is to provide an improved voltage indicator including only one electron ray tube and associated circuit for indicating and identifying both direct current and alternating voltages.

Another object of the invention is to provide an improved circuit tester by means of which failures in electrical, radio and electronic circuits may be quickly and easily determined, which is substantially indestructible in ordinary use, and which will not affect the electrical characteristics of the circuit under test.

These and other objects are achieved in accordance with the invention by providing a variable resistor in the anode circuit of an electron ray tube. The resistor may be so adjusted that any increase in the voltage applied to the grid of the tube beyond a predetermined value causes no corresponding increase in the electronic current flowing in the anode circuit of the tube. By this means, the target of the tube always gives a discernible and identifiable indication of the voltage applied to the grid. A resistor in the grid circuit limits flow of current in that circuit on the application to the grid of positive voltages in excess of a predetermined value. A variable cathode resistor provides for suitable adjustment of bias, and a time delay circuit connected between the grid and ground stores energy derived from the applied signal to be indicated, so that on removal of the applied signal, the time of discharge of the stored energy provides a measure of the value of the applied voltage. The discharge is effected through an input resistor of substantial value which serves, also, to prevent loading of the circuit from which the voltage to be indicated is derived.

Figure 2:
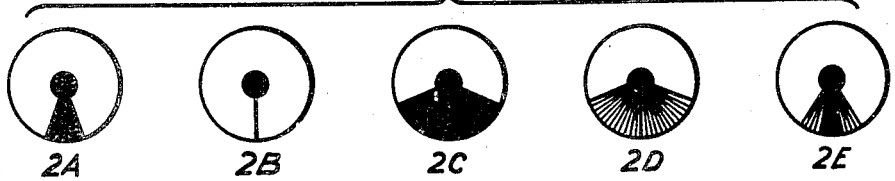
Figure 3:
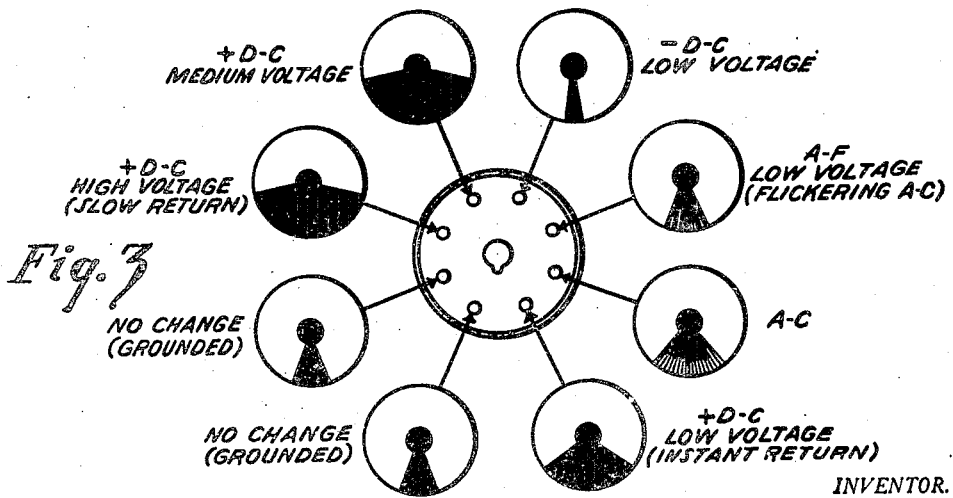

The invention may be better understood from a consideration of the following description of an embodiment thereof, when read in conjunction with the accompanying drawing, in which:

Figure 1 is a diagrammatic view, but partly in perspective, of a circuit tester embodying the indicator of the invention, Figures 2a—2e, inclusive, are illustrations of indications which will be given when voltages of different kinds are applied to the tester of Figure 1, and Figure 3 illustrates voltage indications which will be obtained from the terminals of a multi-electrode tube of the type ordinarily used in radio receivers.

Fig. 1 shows an electron ray tube 10, which may be an RCA type 6E5, having a cathode 12, a grid or signal input electrode 14, an anode 16 and a fluorescent target 18. The anode and target are connected to a source of supply (not shown) which may have a potential of from 180 volts to 230 volts. The connection from the anode to the source of supply includes a variable resistor 20, which may have a value of 10 megohms. An anode resistor is essential to the proper operation of an electron ray tube because it provides the voltage drop between anode and ray control electrode, which causes the shadow to be seen in the target. Ordinarily, a fixed resistor of 1 megohm or .5 megohm is used for this purpose, depending on whether the anode potential is of the order of 250 volts or 100 volts, respectively; but as far as I am aware, resistors in excess of 1 megohm have never been used in the anode circuit of an electron ray tube, nor have variable resistors been used for that purpose. The object of using a variable resistor of so high a value is to limit anode current in manner hereafter explained.

A variable resistor 22 is connected between the cathode 12 and ground. The preferred values of all circuit elements are shown on the drawing.

An insulated probe 32 and shielded test lead or cable 34, which serves to prevent stray pickup, are connected to the grid 14 by means of a conductor 36 and a grid resistor 24. Connected in series between the conductor 36 and ground are a resistor 26 and a capacitor 28; and in parallel with this resistor-capacitor combination (and, therefore, also connected between the conductor 36 and ground) is a resistor 30 which serves as a high resistance input for the tester, as well as a direct current grid return circuit.

The operation of the device is as follows: Suitable potentials having been applied to the heater, anode and target of the tube, a shadow having an angle of about 90° will be seen in the target if the grid is at zero bias and no input signal or external voltage is applied. The cathode bias resistor 22 should now be adjusted to increase the bias and reduce the shadow angle to about one-third of normal (see Figure 2a). It has been found that more satisfactory voltage indications are given when this adjustment has been made, partly because positive voltages to be indicated are ordinarily greater in value than negative voltages, and partly because the relation between the value of a negative voltage applied to the grid and the reduction in shadow angle caused thereby appears to be somewhat logarithmic.

The next step in calibration of the indicator is to apply a regularly alternating voltage to the grid of the tube; and for this purpose, the 6.3 volt, 60 cycle per second heater supply is preferred. This causes two illuminated portions to appear on either side of the shadow, intermediate in light intensity between the shadow and the remainder of the target. The anode resistor 20 is then adjusted until the edges of these two illuminated portions are in contact, without overlapping each other. This adjustment having been made, the source of alternating voltage may be disconnected; and thereafter the application to the grid 14 of a voltage in excess of about 6 or 7 volts will not cause any increase in anode current, and therefore no overlapping of the differently illuminated portions of the target will occur. Other means may, if desired, be employed for determining the point at which an increasing grid voltage causes no increase in anode current. Thus, a milliameter may be connected in the anode circuit and direct current voltages of successively increasing amounts applied to the grid. Observation of the meter readings will determine when anode current becomes constant, notwithstanding an increase in grid voltage.

An unvarying negative voltage applied to the grid (as by means of the probe 32) will cause a partial or complete closing of the shadow angle, depending on the value of the voltage applied (see Figure 2b). An unvarying positive voltage causes an increased opening of the shadow angle (Figure 2c); but it never becomes as great as 180°, and the relative value of the applied voltage is determined by means of the time delay circuit constituted by the resistor 26 and the capacitor 28. When a steady voltage is applied to the grid, a charge is assumed by the capacitor 28 and, on removal of this voltage (as by removal of the probe from the point in the circuit whose voltage is to be indicated), the charge will leak off mainly through the resistors 30 and 26. The time of this discharge depends on the value of the voltage originally applied to the grid, so that with comparatively low positive voltages, the shadow will immediately return to normal on removal of the probe, while with comparatively high voltages, the return will be slow, and with intermediate voltages (for example, screen grid voltages) the period of return will be intermediate.

As may be seen from Fig. 3, the indicator may be used applying these principles to distinguish anode from screen, and either from cathode or grid. Satisfactory indications of both positive and negative voltages have, by this means, been obtained in the range from .5 volt to 1000 volts. The grid resistor 24 has no effect when a negative voltage is applied but limits the flow of grid current on the appliction of a positive voltage, which might otherwise ruin the tube, or at least unduly load the circuit from which that voltage is derived.

Now, since regularly alternating voltages include positive and negative peaks, and since no overlapping can occur because of the adjustment of the anode resistor, alternating voltages applied to the grid are indicated by an alternate increase and decrease of the shadow angle. At frequencies of 30 cycles per second and less, these alternations are discernible by the human eye; but at higher frequencies, the deflection area is characterized by partial illumination, intermediate in light intensity between that of the shadow and the remainder of the target (see Figure 2d). Satisfactory indications of alternating voltage have been obtained in the range from .4 to 1000 volts R. M. S. When the negative peak is less than is sufficient to close the eye, there will be a reduced shadow with partially illuminated portions on either side (Figure 2e); by the same reasoning, speech or other irregular modulations at ordinary frequency are indicated by a flickering of the partially illuminated portions in two directions (Figure 3), and flickering in one direction only is caused by interrupted or pulsating direct current voltages.

The indicator is particularly useful in the testing of radio and other electrical circuits. The grid resistor 24 makes it indestructible in ordinary use because comparatively high voltages may be applied without damage to the circuit, such as might be caused to a voltmeter having mechanical parts, if that meter were not being operated on the proper scale. The tester is also quick and easy to use. Once the two calibrations before-mentioned have been made, all that is necessary is to apply the probe to the point whose voltage is to be indicated. The indicator will then identify the polarity of a voltage and distinguish between direct current voltages, regularly alternating voltages, modulated voltages at ordinary frequencies, and the various other kinds of voltages before mentioned. The presence of the high input resistor 30 and of the grid resistor 24 enables these indications to be given with a minimum of loading of the circuit under test. The voltage of a bias cell, for example, will be indicated through a high impedance circuit (such as is found in a radio receiver), and this would be extremely difficult with any other comparably simple indicator. Bucking voltages are indicated by their predominant polarity, or, when they balance, by an absence of change in the shadow angle. Leaking capacitors, a frequent source of failure in a radio receiver, will be indicated by a change in the shadow angle caused by the direct current voltage which they permit to pass. With circuits which carry both direct and alternating voltages, the indicator will show the predominating component with greatest intensity, and minor components in proportion to their respective values. With such mixed voltages, a capacitor in series with the input of the indicator will prevent direct voltages from reaching the grid, so that an indication will be obtained of the alternating component. Similarly, if the capacitor is connected between the input of the indicator and ground, the alternating component will be by-passed and the direct current component shown by the tube.

There has thus been described a voltage indicator including an electron ray tube having a variable resistor in its anode circuit for limiting anode current on the application to the grid of a voltage in excess of a predetermined amount, so that overlapping of the differently illuminated portions of the target does not occur, and satisfactory indications may be obtained of voltages having many different characteristics. A resistor in the grid circuit limits the flow of current in that circuit, so that comparatively high positive voltages may be applied without damage to the tube, and without excessive loading of the circuit from which such voltages are derived. By means of a time delay circuit, the relative values of potentials applied to the grid may be distinguished; and all of these indications, and combinations and applications of them, may be obtained without affecting the electrical characteristics of the circuit whose voltage is to be indicated.

While the invention has been described primarily with reference to its use as a circuit tester, applications of it will find use wherever a visible indication of voltage or of the absence of voltage is desirable. For example, the indicator of the invention may be used as a tuning indicator in the discriminator circuit of a frequency modulation receiver, both where the tuning is to be at zero voltage and also where the tuning may be desirably off-center.

I claim as my invention:

1. A voltage indicator including an electron ray tube having a signal input electrode, a cathode, an anode, and a fluorescent target electrode, a circuit interconnecting said anode and said target electrode, a source of positive voltage, means connecting said circuit to said voltage source, a variable resistor included in said interconnecting circuit and positioned between said anode and said connecting means, the value of said resistor being such that any increase in the voltage applied to said signal input electrode beyond a predetermined value causes no corresponding increase in the current flowing in said interconnecting circuit, a circuit connecting said signal input electrode and said cathode, said last mentioned circuit including a grid current limiting resistor and a series connected resistor-capacitor series combination, the value of the resistor in said combination being relatively low, a relatively high value resistor in parallel with said combination, and a variable cathode resistor in series with said combination for controlling the magnitude of the nominal plate current derived from said tube.

2. A voltage indicator according to claim 1, which includes an insulated probe connected to said signal input electrode for applying a signal thereto.

ARTHUR LIEBSCHER.

REFERENCES CITED

The following references are of record in the file of this patent:

UNITED STATES PATENTS

| Number | Name | Date |
|---|---|---|
| 2,105,410 | Daniels | Jan. 11, 1938 |
| 2,150,467 | Stain | Mar. 14, 1939 |
| 2,167,842 | Jackson | Aug. 1, 1939 |
| 2,175,690 | Hoppe | Oct. 10, 1939 |
| 2,219,506 | Steimel et al. | Oct. 29, 1940 |
| 2,235,173 | Shepard, Jr. | Mar. 18, 1941 |
| 2,280,607 | Roberts | Apr. 21, 1942 |
| 2,291,648 | Rider et al. | Aug. 4, 1942 |